J. G. SJÖSTRÖM.
MATCH SPLINT ASSEMBLING MACHINE.
APPLICATION FILED AUG. 20, 1909.

1,011,506.

Patented Dec. 12, 1911.
9 SHEETS—SHEET 1.

Fig. 1.

J. G. SJÖSTRÖM.
MATCH SPLINT ASSEMBLING MACHINE.
APPLICATION FILED AUG. 20, 1909.

1,011,506.

Patented Dec. 12, 1911.
9 SHEETS—SHEET 3.

J. G. SJÖSTRÖM.
MATCH SPLINT ASSEMBLING MACHINE.
APPLICATION FILED AUG. 20, 1909.

1,011,506.

Patented Dec. 12, 1911.

J. G. SJÖSTRÖM.
MATCH SPLINT ASSEMBLING MACHINE.
APPLICATION FILED AUG. 20, 1909.

1,011,506.

Patented Dec. 12, 1911.
9 SHEETS—SHEET 5.

Witnesses

Inventor

UNITED STATES PATENT OFFICE.

JOHN GOTTHARD SJÖSTRÖM, OF JÖNKÖPING, SWEDEN.

MATCH-SPLINT-ASSEMBLING MACHINE.

1,011,506.     Specification of Letters Patent.     Patented Dec. 12, 1911.

Application filed August 20, 1909. Serial No. 513,881.

*To all whom it may concern:*

Be it known that I, JOHN GOTTHARD SJÖSTRÖM, a subject of the King of Sweden, residing at Jönköping, in the Kingdom of Sweden, have invented new and useful Improvements in Match-Splint-Assembling Machines, of which the following is a specification, reference being had to the drawings accompanying and forming a part hereof.

This invention relates to match-splint-assembling machines of the kind in which the splints are agitated in a magazine and caused to drop endwise from the upper part of the said magazine into compartments or cells in the lower part thereof, in order to be thereupon inserted at predetermined interdistances into a holder or splint carrier in which they are locked in position for further treatment.

For filling a splint carrier the following operations are to be performed: first, placing the empty splint carrier in the machine and opening same for receiving match splints, said opening of the carrier being, preferably, performed by inserting wedges or spacers between the clamping organs (laths or bars) for keeping said organs spaced apart during the filling of the carrier; second, applying the grate for holding the splints at certain distances apart, before they are locked in position; third, lowering the splint magazine into horizontal position and agitating same for filling the compartments or cells of the lower part of the magazine with splints from the upper part thereof; fourth, raising the magazine into vertical position for disconnecting the two parts thereof; fifth, swinging down the lower part of the magazine into horizontal position above the splint carrier; sixth, displacing the bottom plate of the magazine for opening the bottoms of the cells; seventh, agitating the lower magazine part for dropping splints between the clamping organs of the splint carrier; eighth, raising the lower part of the magazine into vertical position; ninth, withdrawing the wedges or spacers; tenth, pressing together the clamping organs for locking the splints; eleventh, removing the grate, and twelfth, removing the filled splint carrier from the machine.

The object of this invention is to provide a machine by which all the said operations, except the placing of the splint carrier in the machine, the spacing of the clamping organs and the removal of the filled splint carrier, are performed automatically.

The invention consists, chiefly, in providing means, such as a cam roller, for lowering and raising the splint magazine and performing the other operations required.

The invention further comprises the construction and combination of parts hereinafter more particularly described.

In the drawings, I have shown a suitable form of embodiment of the invention.

Fig. 1ª is a longitudinal section of the same. Fig. 1ᵇ is an elevation of the machine on the side opposite to Fig. 1. Fig. 3ª is a cross-section thereof. Fig. 10 is a side elevation and Fig. 11 is a plan view of the device for throwing the agitating means into and out of operation. Fig. 12 is a side elevation and Fig. 13 is a plan view of the device for pressing together the clamping organs of the splint carrier. Fig. 13ª is a view on an enlarged scale of a detail of Fig. 13. Figs. 14–16 are side elevation, end view and plan view, respectively, of the device for starting and stopping the machine.

Figure 1:
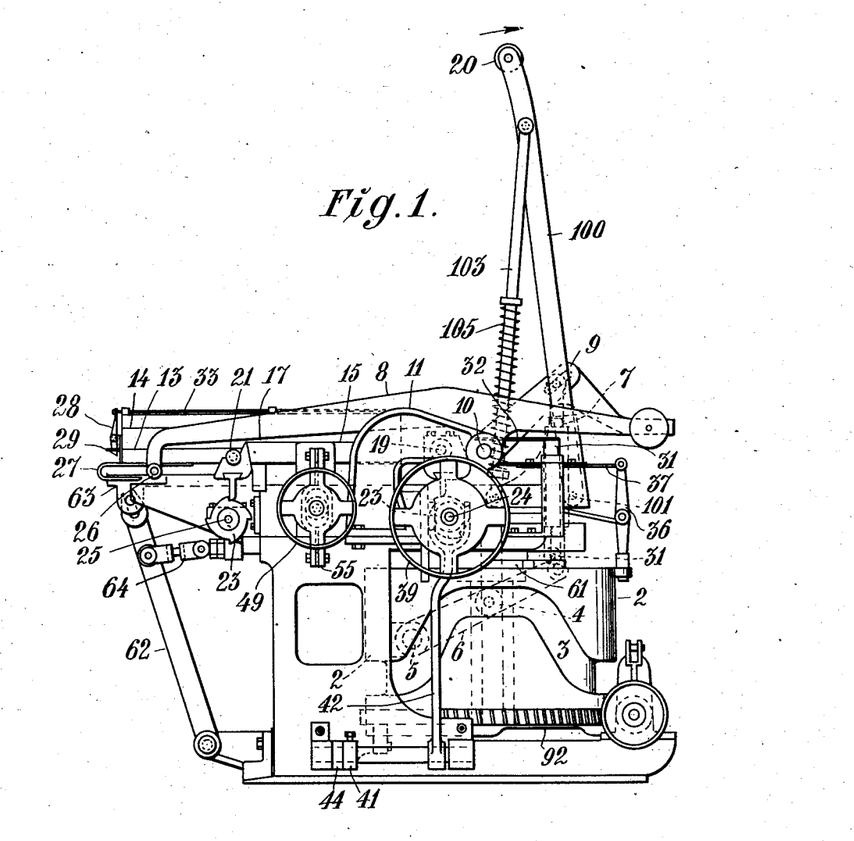
Figure 1 is a side elevation of the machine.
Figure 2:
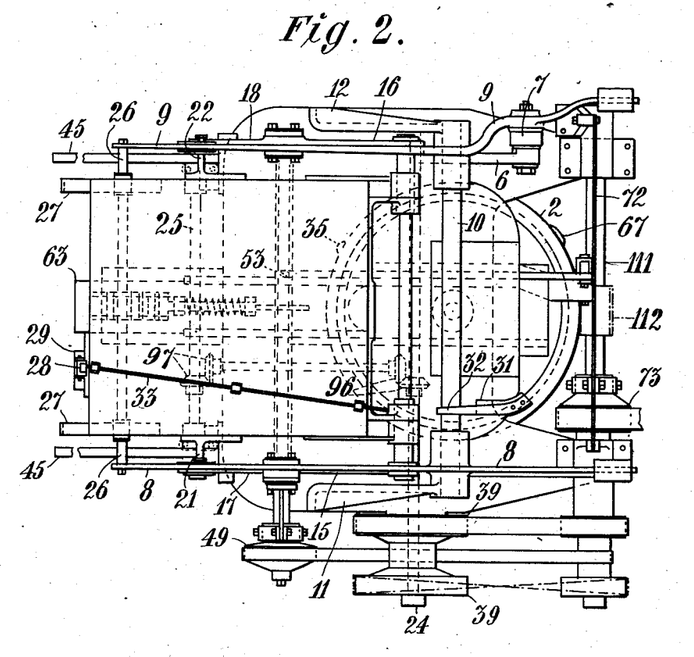
Fig. 2 is a plan view of the machine.

Referring to the drawings, the raising and lowering of the magazine is performed by a groove 3 (Fig. 4) in the cam roller 2. Engaged by the said groove is a roller 4 (Fig. 1) attached to a lever 6 fulcrumed on the pivot pin 5, said lever being connected by a link-rod 7 (Fig. 1ᵇ) of adjustable length to the one 9 of a pair of levers 8, 9, (Fig. 2) keyed to the shaft 10. The shaft 10 is journaled in bearings 11 and 12 attached to the machine frame. As usual, the two parts 13 and 14 of the splint magazine are journaled at one end about a shaft 19 carried by the agitating arms 15 and 16 adapted to swing on pivots 94 (Fig. 1ᵇ) and in their upright position rest on the said shaft and the supporting roller 20. The latter is yieldingly supported in order to compensate for inappropriate length of stroke of the arms 8 and 9. It may be attached to a bar 100 movable on a pivot pin 101 and guided at its lower end in a trestle 102 attached to the machine frame. Extending from the fore part of the said trestle to the upper part of the bar 100 is a springy three-part link 103 adapted to expand if the roller 20 is strongly actuated in the direction of the arrow and to resume its former length under the action of the spring 105, when the pressure on the roller 20 ceases. The magazine in its horizontal position is carried by the shaft 19 and the agitating arms 17, 18 adapted to swing on pivots 95 (Fig. 1ᵇ) bearing on pins 21, 22 at the lower part of the magazine. The four agitating arms 15, 16, 17, 18 are supported by disks or cams 23 attached to the rotary shafts 24 and 25 and serving to agitate the magazine. The levers 8 and 9 are connected together at their fore ends by means of a rod 26 serving to impart the movements of the levers to the magazine. In order to cause the magazine to move from its vertical position clamps 27 are attached to the lower part of the magazine in position to engage the rod 26 at both sides thereof. Inasmuch as the magazine and the levers 8 and 9 do not turn about the same axis the rod 26 has such a position, when the magazine is folded down, as to lie entirely outside the clamp so that the magazine may be freely agitated.

In order that the two parts 13, 14 of the magazine may be lowered together, they are connected to each other by means of a pawl 28 attached to the upper part 14 of the magazine and engaging an eye 29 at the lower part 13 thereof. The disconnection is performed while the two parts of the magazine are still in upright position by a lug or cam 30 on the cam roller 2 (Fig. 4) which causes a slide 31 (Fig. 2) movable in a sleeve attached to the machine frame to move upwardly. Attached to the upper end of the slide 31 is a spring 32 adapted to press the rod 33 upward, when it takes up a nearly vertical position, by which the rod will disengage the pawl 28.

The splint magazine is substantially of a well known construction. It suitably consists of two boxes 13, 14 (Fig. 19) hinged together at one edge so as to be capable of opening out like a book. The lower box 13 suitably consists of a rectangular wooden frame having several rows of tubes or tubular cells 106. The upper or supply box 14 suitably consists of a similar wooden frame with vertical partitions or division plates 107 from which short transverse division plates 108 stand out, also vertically, but at right angles to the latter. Placed in the lower part of the tube box 13 is a movable bottom 34 serving to normally prevent the splints from dropping. When the two boxes 13, 14 are connected together and agitated in horizontal position, the tubes in the lower box are filled with splints from the supply box. Thereupon the whole magazine is raised and the lower box is disconnected from the upper one, whereupon the tube box is lowered solely into horizontal position. By a slight movement of the perforated bottom 34 the tubes in the lower box are opened so that the splints are free to drop into the carrier. The lower box, after being emptied is again raised into vertical position close up to the supply box. The closing of the tubes in the lower box takes place automatically by the bottom 34 dropping down into closing position. It is to be noted that, when the two halves 13 and 14 of the magazine are lowered together, the agitation of the magazine commences when the magazine is still in vertical position. Since the bottom 34 is not locked in its open position but is retained therein merely by friction against its guides, it will be caused by the agitating movement to drop into closing position. To this end only a few agitations of the magazine are required, and these agitations will take place before the magazine has moved considerably from the vertical position.

Obviously the invention is not limited to the construction of the magazine hereinbefore described, but any construction suitable for the purpose may be adopted without departing from the spirit and scope of the invention.

The sliding movement of the plate 34 is produced by a cam 35 (Figs. 4 and 7) on the cam roller 2. The cam 35 to this end acts on a double-armed lever 36 having attached to it, at its upper end, a slide 37 acting on the bottom plate 34.

As hereinbefore mentioned, the agitation of the magazine is produced by the rotation of the shafts 24 and 25. Said shafts are connected to each other by any suitable gearing such as a bevel gear 96, 97 (Fig. 2) and may be driven by belting from the driving shaft to the belt pulleys 39. The connection is established by a cam 40 at the lower side of the cam roller 2, said cam acting on the lever 41 (Figs. 10 and 11) and through the latter on the lever 42 and the friction clutch connected thereto so as to cause the shafts 24 and 25 to rotate. In addition to the described device for automatic connection a further lever 44 having a treadle is provided by the pressing down of which an agitating movement may be obtained even when the cam roller 2 is at rest. The lever 44 is particularly used when the magazine is to be filled.

When the matches are to be dropped from the magazine into the splint carrier, it is of importance that the magazine is as near the carrier as possible. After agitation of the magazine it occurs, however, frequently that the agitating arms rest on elevated points of the cam wheels 23. In such case the shafts 24 and 25 must be turned back until the arms rest on the lowermost points of the cam wheels. To this end the shaft carries a second belt pulley 39 adapted to cause the shafts 24 and 25 to turn slightly in the opposite direction in Figs. 1 and 2 the latter belt pulley 39 is not shown. The said second belt pulley 39 turns the shafts only until the pins or the like projecting downwardly from the arms abut against the cam teeth, whereupon the clutch runs loosely. The throwing of the latter pulley 39 into action is performed by the roller of the lever 41 which enters through the action of the spiral spring 91 into a recess 92 (Fig. 4) in the cam surface 40.

Figures 4, 5, 6, 7, 19:
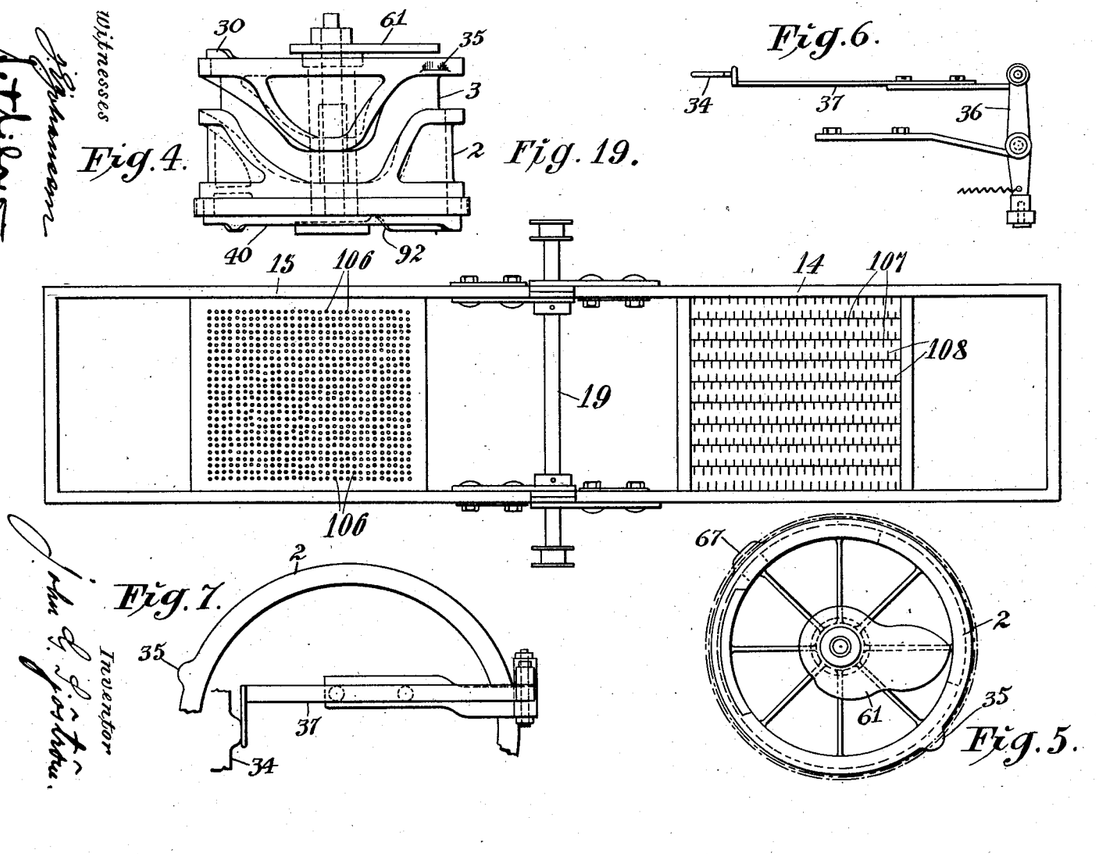
Figs. 4 and 5 are side elevation and plan view, respectively, of the cam roller.
Figs. 6 and 7 are side elevation and plan view, respectively, of the device for opening the bottoms of the cells of the lower part of the magazine.
Fig. 19 is a plan-view of the magazine showing the parts folded out.
Figure 8:
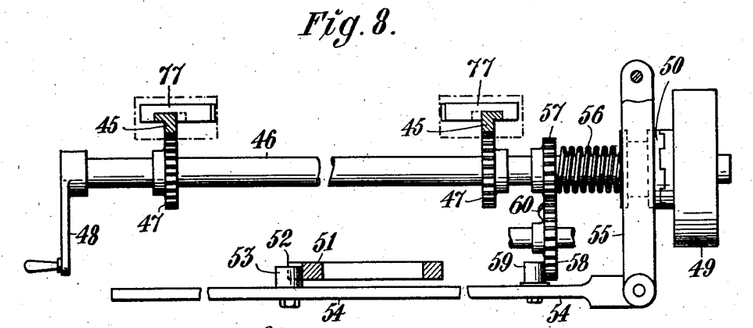
Fig. 8 is an elevation and partial section and Fig. 9 is a plan view of the device for withdrawing the wedges used for keeping the clamping devices of the carrier apart from each other during the filling of the carrier.
Figure 9:
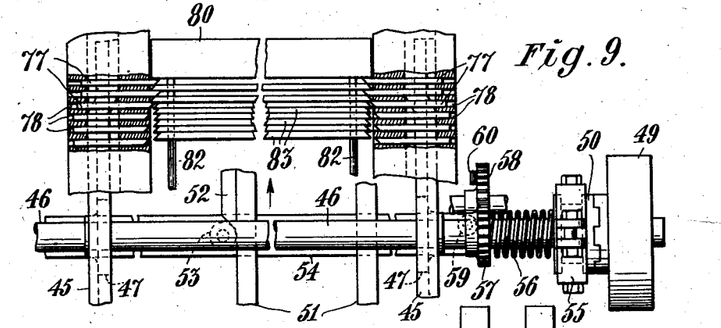
Figures 10, 12, 13, 13A:
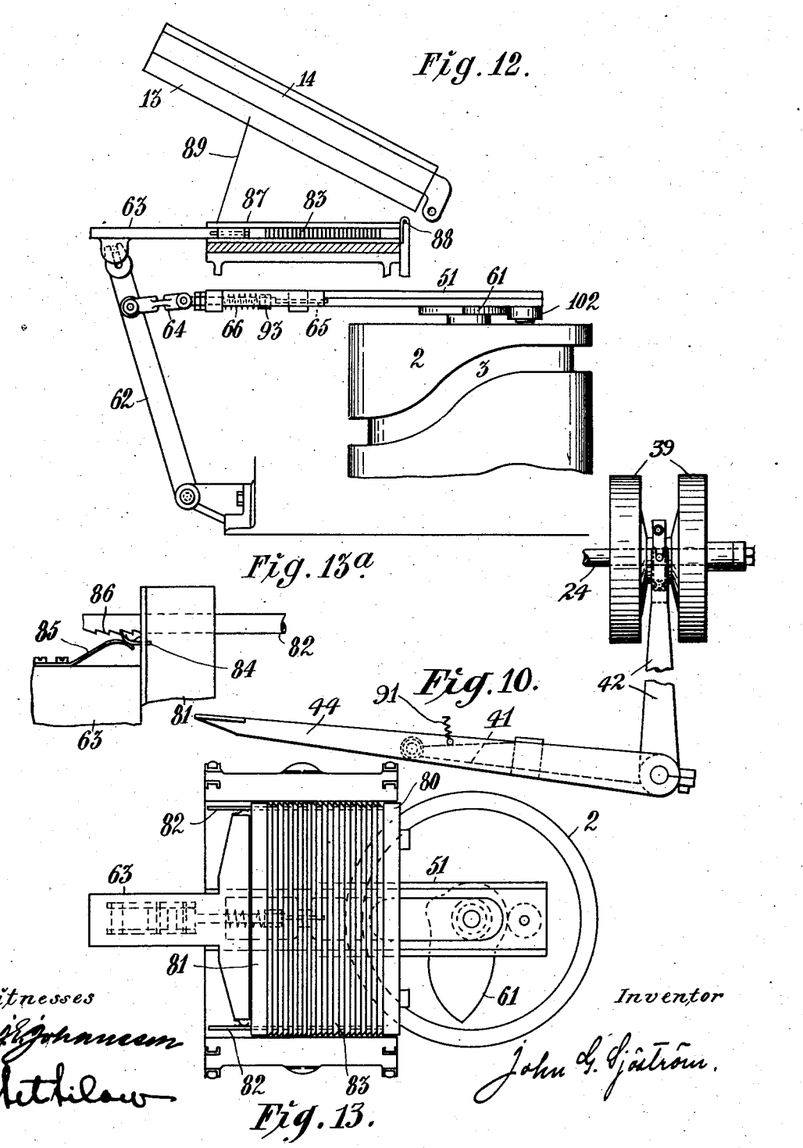
Figure 11:
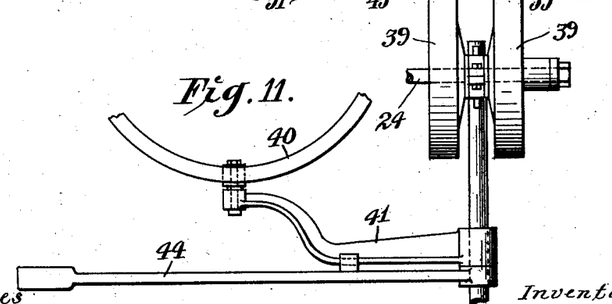

In order to enable the clamping organs to be pressed toward each other so as to clamp the matches between them, the wedges or spacers inserted between the clamping organs must first be withdrawn. This is performed by a sliding movement of the rods 45 (Figs. 8 and 9) by which the wedges are moved horizontally. The movement of the rods 45 is produced by a turning movement of the shaft 46, which carries two pinions 47 engaging teeth at the lower side of the rods 45. The insertion of the wedges is performed by turning the shaft 46 by hand by means of the crank 48. The withdrawing of the wedges is performed by the clutch 49, 50, one part 49 of which forms a belt pulley adapted to be driven from the driving shaft, or otherwise. The pulley 49 is thrown into action by a slight longitudinal movement of the slide 51 in the direction of the arrow (Fig. 9). Projecting from the slide 51 is a cam 52 acting on a roller 53 on the rod 54, said rod being connected to a lever 55 actuated by a spring 56 so that, when the roller 53 leaves the cam 52, the spring 56 throws the clutch part 50 into engagement with the belt pulley 49. The disconnection of the clutch part 50 is not performed by the slide 51, but to this end a special device is provided consisting of the cog wheels 57, 58 and the roller 59 placed on the rod 54. The wheel 58 has such a diameter in relation to that of the wheel 57 that it need not perform a full revolution in order to cause the wedges to be withdrawn. Placed on the wheel 58 is a cam 60 adapted to act on the roller 59 so as to throw the clutch part 50 out of engagement with the pulley 49 when the desired operations have been performed. When the next splint carrier is to be placed in position and the clamping organs therein are to be moved apart, the slide 51 is in its retracted position and thus keeps the clutch part 50 disengaged until it is to be thrown into engagement. The pressing together of the clamping organs is performed by a cam 61 placed above the cam roller 2 (Fig. 4). The cam 61 acts on a slide 51 (Figs. 12 and 13) connected to a lever 62 which is connected at its upper end to the slide 63 serving to press the clamping organs together. The movement of the slide 51 is produced by the cam 61 bearing on a roller 102 attached to the slide 51, said roller being kept pressed against the cam 61 by a spring (not shown). In order to obtain a constant pressure of the clamping organs against the matches, even when the latter are of a varying thickness, the slide 51 is yieldingly connected to the lever 62, suitably by means of a link 64, a rod 65 and a spiral spring 66, as shown in Figs. 12 and 13. The tension of the spring 66, and thereby the pressure of the clamping organs against the matches may be regulated by means of the nuts 93.

The cam roller 2 is driven from a shaft 111 by a worm gear 112. In order to stop the machine when a splint carrier has been filled, the cam roller 2 is provided, at its lower edge, with a cam 67 (Fig. 16) acting through the intermedium of the slide 68, the arm 69, the shaft 70, the arm 71 and the rod 72 to throw the friction clutch 73 out of action. When the cam roller 2 rotates, the slide 68 in a certain position of the said roller rides on the cam 67. The bolt 75, which is slidably mounted in the arm 69 so as to be able to move in its longitudinal direction, i. e. in a direction at right angles to the slide 68, is connected to the lever or handspike 76 mounted on a pivot pin 98 attached to the arm 96. Normally the free end of the bolt projects into a notch 74 at the end of the slide 68. When the slide 68 is moved by the cam 67 in its longitudinal direction, it presses on the bolt 75 and turns the said bolt as well as the arm 69 attached to the shaft 70 and the lever 76 pivoted to the said arm about the axes of the shaft 70. On account thereof the shaft 70 with the arm 71 is turned about its axis, whereby the arm 71 causes the rod 72 to move longitudinally so as to disconnect the clutch 73. As long as the end of the bolt 75 is in the notch 74 of the slide 68 and the latter is engaged by the cam 67, the clutch is obviously disconnected and the machine is at rest.

The starting of the machine is performed by turning the lever 76 about its pivot pin 98 in such a direction as to cause the bolt 75 to move longitudinally out of the notch 74 in the slide 68. The spring 73' then presses the one clutch part against the other rotary clutch part, so that the parts 69, 70, 71, 72, 73 and 73' take up the positions which they had before the slide 68 was engaged by the cam 67, and the machine is started. When the cam roller 2 again commences to rotate, the cam 67 leaves the slide 68 which is pressed by its spring 68' against the cylindrical part of the cam roller. The bolt 75 is now again just opposite the recess, and under the influence of the spring 76' connected at one end to the arm 76 and at its other end to the arm 69, the lever 76 with the bolt 75 connected thereto is swung about its pivot pin 98 toward the slide 68 until the end of the bolt 75 presses on one side of the notch 74, by which the device is again in position to disconnect the clutch 73 as soon as the slide 68 mounts the cam 67.

If the machine is to be stopped in a position in which the slide 68 is in contact with the cylindrical part of the cam roller 2, the lever 76 is turned outwardly in the longitudinal direction of the slide 68 (about the axis of the shaft 70) so that the bolt 75 is moved away from the outer end of the slide 68, in front thereof, by which the parts 75, 69, 70, 71, 72 and the clutch 73 are caused to perform the same movements as before under the influence of the slide 68 so as to stop the machine. By means of the lever 76 the bolt is thereupon moved in its longitudinal direction until the end of the bolt 75 rests on the outer end of the slide 68, outside the notch 74. As long as the parts take up this position the clutch 73 is disconnected. In order to start the machine from such a position the bolt 75 is moved by the lever 76 in a backward direction, away from the slide 68, until the end of the bolt 75 enters into the notch 74.

The carrier or dipping frame, which is to receive the splints, may be of any suitable construction. In the embodiment shown it consists of two wooden bars 80, 81 (Fig. 13) connected together by two rods 82 on which one 81 of the bars is capable of sliding so as to approach to or recede from the other. Upon these rods 82, and between the bars 80, 81, are a series of loose laths 83. These laths are for receiving and holding the splints and are opened out for that purpose by means of two rows of wedges or spacers 77. The locking of the laths of the carrier in compressed position is effected by the slidable bar 81 being locked in position on the rods 82. For this purpose the slidable bar 81 is provided with small pawls 84 (Fig. 13ᵃ) adapted to be pressed by springs 85 attached to the slide 63 into engagement with the rods 82 which are provided at the sides adjacent to the pawls 84 with teeth 86. When the slide 63 is retracted after having compressed the carrier laths, the bar 81, under the influence of the tension of the compressed splints, partakes in the movement until the pawls 84 abut against two corresponding teeth 86 on the rods 82 by which the bar 81 is locked in position under the influence of the tension of the splints.

Figures 3, 17, 18:
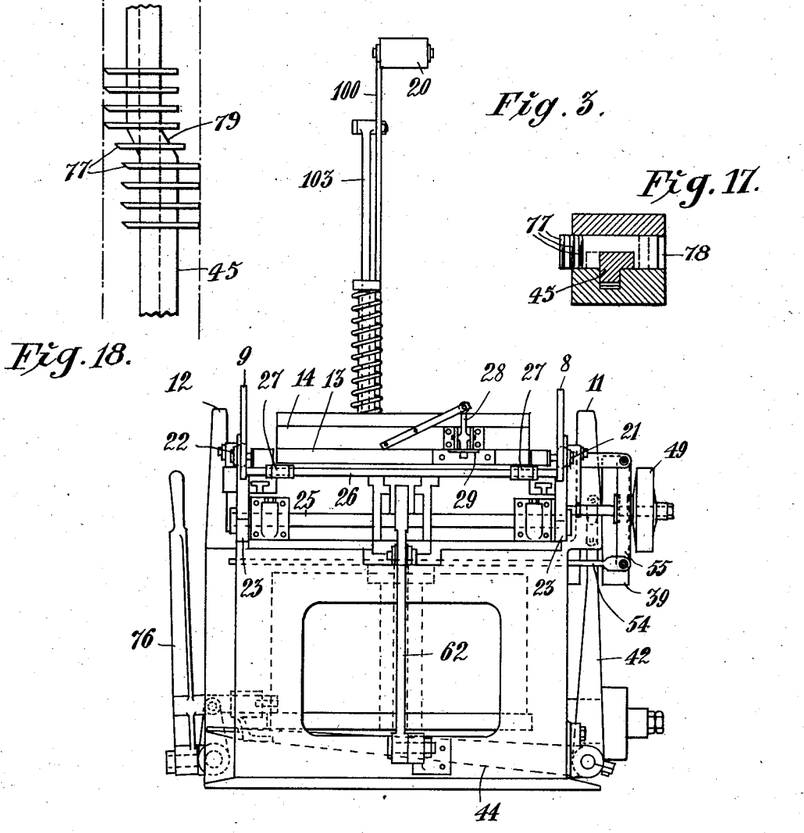
Fig. 3 is an end view of the same.
Figs. 17 and 18 show the spacing wedges and the operating bar therefor, Fig. 17 showing a cross-section of the said bar and Fig. 18 a plan-view thereof.
Figures 3A, 15, 16:
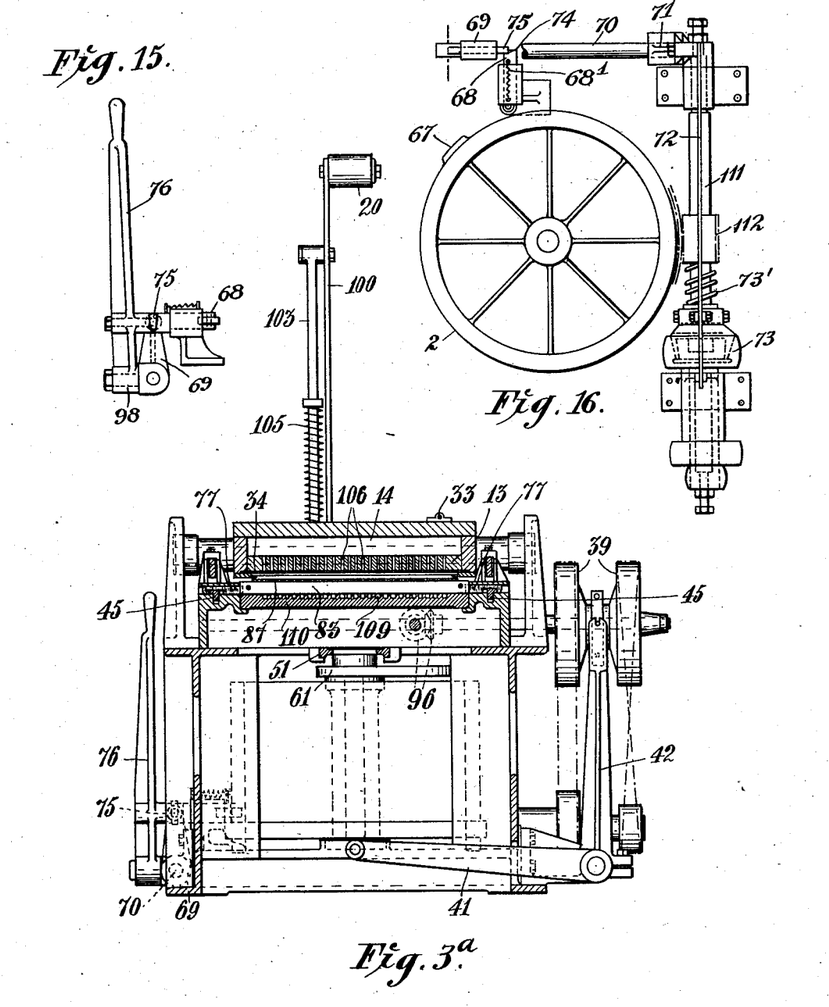

Figs. 17 and 18 illustrate the well-known manner in which the slide bars 45 operate the wedges for spacing the carrier laths apart. The wedges 77 move in slots 78 extending at right angles to the slide bars 45. At the lower side of the wedges are angular recesses engaged by the slide bar 45 which is provided with a knee 79 for moving the wedges. When the slide bar 45 is moved in one or the other direction the knee 79 presses on the inner side of one wedge after the other and thereby causes the wedges to move in their longitudinal direction so that they will penetrate between the carrier laths or move away from the same.

The manner in which the carriers and the spacing grid are supported on the machine is clearly shown in Fig. 12. The carrier is supported on a plate or grating having grooves for receiving the ends of the splints and guiding same during the compression of the carrier. The grid 87 in its horizontal position rests on the carrier. It is adapted to be turned on pins or hinges 88, and the fore side thereof is attached by strings 89 or the like to the lower box 13 of the magazine. The grid thus to a certain extent partakes in the up and downward movements of the box 13 of the magazine by which special devices for operating it are avoided.

Figure 1A:
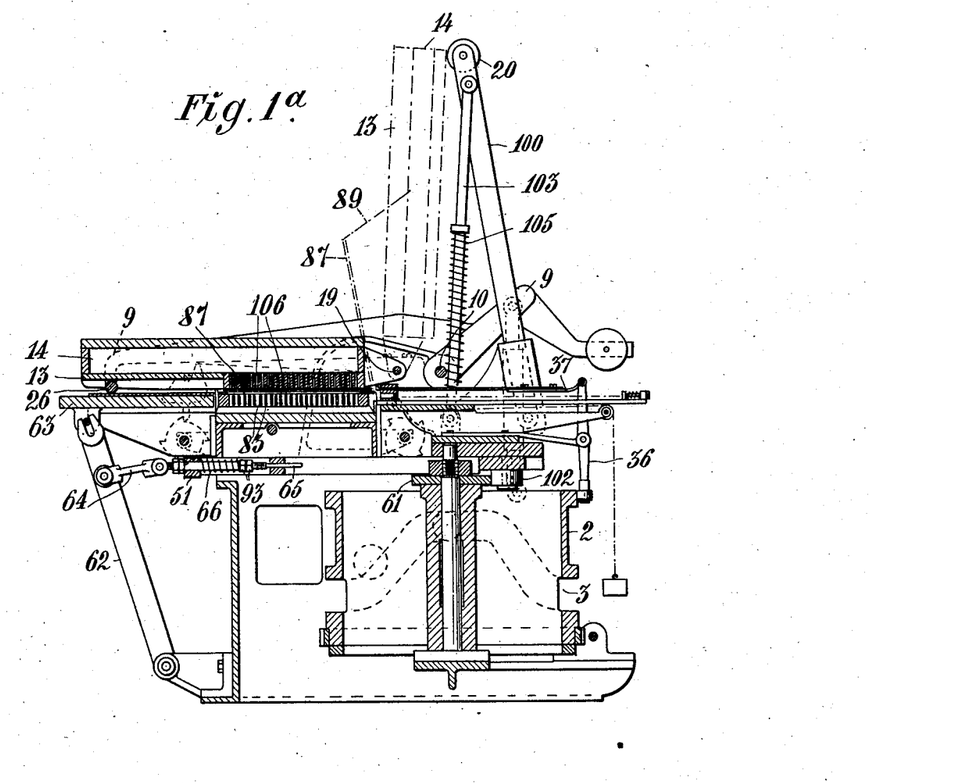
Figures 1B, 14:
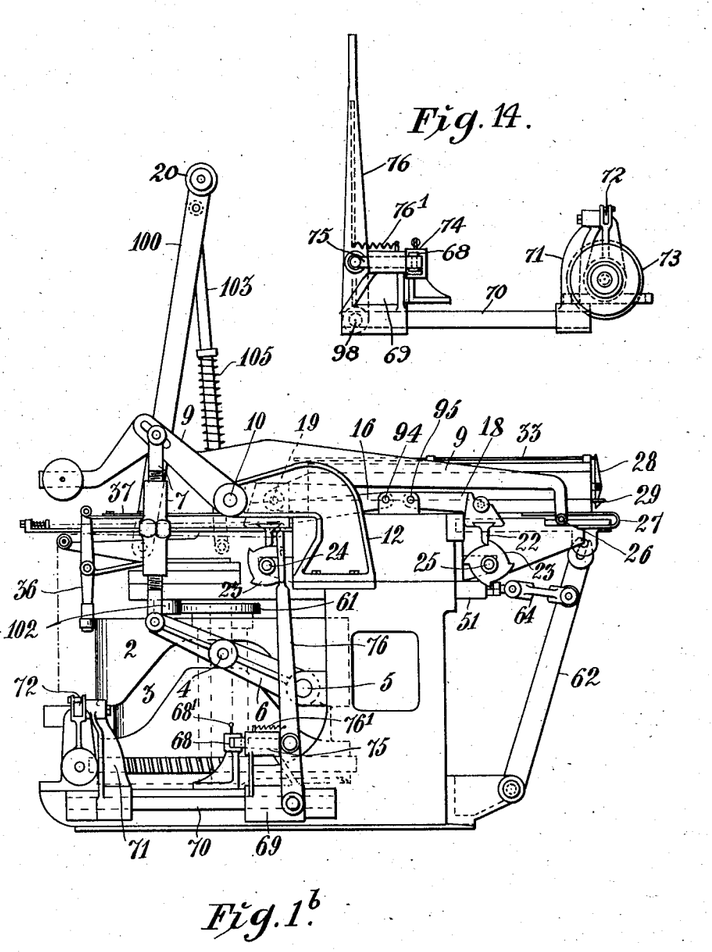

When a splint carrier has been placed in the machine and opened by turning the shaft 46 by hand, the machine is started by a lateral movement of the lever 76 with the bolt 75 connected thereto about the pivot pin 98 so that the bolt 75 moves away from the notch 74 of the slide 68, by which the friction clutch 73 is thrown into action and the cam roller 2 begins to rotate. In the upper part 14 of the magazine the splints are lying in positions parallel to each other and to the tubes or cells 106. By the rotation of the cam roller 2 the two parts 13, 14 of the magazine, which are connected together by the pawl 28, are swung down into horizontal position and agitated. By this means match splints are caused to drop from the upper part 14 of the magazine into the tubes or cells 106 in the lower part 13. Then both parts of the magazine are raised into upright position and disconnected from each other, whereupon the lower part 13 of the magazine is swung down solely into horizontal position leaving the upper part 14 of the magazine in upright position. Thereupon the bottom plate 34 of the lower part of the magazine is moved so as to open the tubes or cells 106 at their bottoms and allow the match splints therein to drop down through the grid 87 between the laths 83 of the carrier. The match splints which have dropped into the carrier are supported at their lower ends in grooves 109 in a bottom plate 110 attached to the machine frame. When the plate 34 has been slid so as to open the tubes or cells 106, the part 13 of the magazine is agitated and then raised into a position in which the grid 87 is still in horizontal position on the carrier and keeps the splints in vertical position. The wedges are thereupon retracted and the carrier laths pressed together by the slide 63. The match splints are thereby caused to slide with their lower ends in the grooves 109 and with their upper ends between the wires or laths of the grid 87. When the match splints have been clamped in the carrier, the slide 63 moves back and the part 13 of the magazine with the grid 87 is moved farther upward into the position indicated by dotted lines in Fig. 1a. The slide 68 thereupon again mounts the cam 67 by which the machine is stopped, whereupon the filled splint carrier is removed by hand and an empty splint carrier is placed in the machine.

I claim:

1. In a machine for filling match-splint carriers of the kind having a number of slidable laths, the combination of a splint-receiving magazine adapted to be placed in a horizontal position above the carrier to be filled, means for swinging down and raising the said magazine, means for pressing together the laths of the said carrier for locking the splints in position therein, and means for automatically operating the said locking means in timed relation to the movement of the magazine, substantially as and for the purpose set forth.

2. In a machine for filling match-splint carriers, the combination of a splint-receiving magazine adapted to be placed in a horizontal position above the carrier to be filled, means for swinging down and raising the said magazine, means for locking the splints in position in the said carrier, means for automatically operating the said locking means in timed relation to the movement of the magazine, and a yielding connection between the said locking means and the operating means therefor, substantially as and for the purpose set forth.

3. In a machine for filling match-splint carriers, the combination of a splint-receiving magazine adapted to be placed in a horizontal position above the carrier to be filled, means for swinging down and raising the said magazine, means for agitating the said magazine vertically in its horizontal position, means for automatically throwing the said agitating means into and out of operation, and means for placing the said agitating means, after operation, in a position in which the magazine takes up its lowest position close to the carrier, substantially as and for the purpose set forth.

4. In a machine for filling match-splint carriers, the combination of a swingably mounted two-part magazine for receiving splints and arranging same in vertical positions, means acting on the lower part of the said magazine for swinging down and raising the same twice during one filling operation, means for keeping the two parts of the magazine together during the first downward swinging movement, and means for unlocking the two parts of the magazine from each other before the second downward swinging movement takes place, substantially as and for the purpose set forth.

5. In a machine for filling match-splint carriers, the combination of a swingably mounted two-part magazine for receiving splints and arranging same in vertical positions, means acting on the lower part of the said magazine for swinging down and raising the same twice during one filling operation, means for agitating the magazine in its horizontal position, means for keeping the two parts of the magazine together during the first downward swinging movement, and means for unlocking the two parts of the magazine from each other before the second downward swinging movement takes place, substantially as and for the purpose set forth.

6. In a machine for filling match-splint carriers, the combination of a swingably mounted two-part magazine for receiving splints and arranging same in vertical positions, means for keeping together the two parts of the magazine, means for dropping the splints into the carrier to be filled, a slide, means for operating the said slide, and a longitudinally movable rod operated by the said slide for unlocking the two parts of the magazine from each other, substantially as and for the purpose set forth.

7. In a machine for filling match-splint carriers, the combination of a swingably mounted two-part magazine for receiving splints and arranging same in vertical positions, means acting on one part of the said magazine for swinging down and raising the same twice during one filling operation, means for agitating the magazine in its horizontal position, means for keeping the two parts of the magazine together during the first downward swinging movement, means for unlocking the two parts of the magazine from each other before the second downward swinging movement takes place, a slidable magazine bottom having holes for allowing the splints to drop into the carrier to be filled, means for moving the said bottom into its splint-dropping position, and means for automatically stopping the machine, when the filling operation has been performed, substantially as and for the purpose set forth.

8. In a machine for filling match-splint carriers, the combination of a splint-receiving magazine adapted to be placed in a horizontal position above the carrier to be filled, means for swinging down and raising the said magazine, means for locking the splints in position in the said carrier, means for automatically operating the said locking means in timed relation to the movement of the magazine, and means for automatically stopping the machine, when the filling operation has been performed, substantially as and for the purpose set forth.

9. In a machine for filling match-splint carriers, the combination of a swingably mounted two-part magazine for receiving splints and arranging same in vertical positions, means acting on one part of the said magazine for swinging down and raising the same twice during one filling operation, a locking device for keeping the two parts of the magazine together during the first downward swinging movement, means for unlocking the two parts of the magazine from each other before the second downward swinging movement takes place, means for agitating the magazine in its horizontal position, a slidable magazine bottom having holes for allowing the splints to drop into the carrier to be filled, means for stopping the machine when the filling operation has been performed, and a rotatable cam roller adapted to operate all the means hereinbefore mentioned in timed relation, substantially as and for the purpose set forth.

10. In a machine for filling match-splint carriers of the kind having a number of slidable laths, the combination of a splint-receiving magazine adapted to be placed above the carrier to be filled, a cam roller, means for rotating the said cam roller, means operated from the said cam roller for lowering and raising the magazine, and means operated from the said cam roller for compressing the laths of the carrier, substantially as and for the purpose set forth.

11. In a machine for filling match-splint carriers of the kind having a number of slidable laths, the combination of a splint-receiving magazine adapted to be placed above the carrier to be filled, a cam roller, means for rotating the said cam roller, means operated from the said cam roller for pressing together the laths of the said carrier, and a yielding connection between the said last mentioned means and the operating means therefor, substantially as and for the purpose set forth.

12. In a machine for filling match-splint carriers, the combination of a splint-receiving magazine adapted to be placed above the carrier to be filled, a cam roller, means for rotating the said cam roller, means operated from the said cam roller for lowering and raising the magazine, means for agitating the said magazine, and means operated from the said cam roller for automatically throwing the said agitating means into and out of operation, substantially as and for the purpose set forth.

13. In a machine for filling match-splint carriers, the combination of a splint-receiving magazine adapted to be placed above the carrier to be filled, a cam roller, means for rotating the said cam roller, means operated from the said cam roller for lowering and raising the magazine, means for agitating the said magazine, means operated from the said cam roller for automatically throwing the said agitating means into and out of operation, and means operated from the same cam roller for retracting the said agitating means into a certain predetermined position, substantially as and for the purpose set forth.

14. In a machine for filling match-splint carriers, the combination of a swingably mounted two-part magazine for receiving splints and arranging same in vertical positions, means for keeping together the two parts of the magazine, means for dropping the splints into the carrier to be filled, a cam roller, means for rotating the said cam roller, a slide operated by the said cam roller, and a longitudinally movable rod operated by the said slide for unlocking the two parts of the magazine from each other, substantially as and for the purpose set forth.

15. In a machine for filling match-splint carriers, the combination of a splint-receiving magazine adapted to be placed on the carrier to be filled, a rotary shaft, a friction clutch for driving the said shaft, a worm on the shaft, a cam roller driven by the said worm, and means operated from the said cam roller for lowering and raising the magazine, substantially as and for the purpose set forth.

16. In a machine for filling match-splint carriers, the combination of a splint-receiving magazine adapted to be placed on the carrier to be filled, a rotary shaft, a friction clutch for driving the said shaft, a worm on the said shaft, a cam roller driven by the said worm, and means operated from the said cam roller for disconnecting the said friction clutch and thereby stopping the machine in a certain predetermined position, substantially as and for the purpose set forth.

JOHN GOTTHARD SJÖSTRÖM.

Witnesses:
ARNOLD LINDMAN,
J. EDW. EDGREN.

Copies of this patent may be obtained for five cents each, by addressing the "Commissioner of Patents, Washington, D. C."